US011045954B2

(12) United States Patent
Saito et al.

(10) Patent No.: US 11,045,954 B2
(45) Date of Patent: Jun. 29, 2021

(54) ROBOT SYSTEM AND METHOD OF CONTROLLING THE SAME

(71) Applicant: KAWASAKI JUKOGYO KABUSHIKI KAISHA, Kobe (JP)

(72) Inventors: Kazuhiro Saito, Akashi (JP); Yasunori Oyama, Akashi (JP); Akihiro Tokumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 29 days.

(21) Appl. No.: 16/485,178

(22) PCT Filed: Feb. 9, 2018

(86) PCT No.: PCT/JP2018/004594
§ 371 (c)(1),
(2) Date: Aug. 12, 2019

(87) PCT Pub. No.: WO2018/147411
PCT Pub. Date: Aug. 16, 2018

(65) Prior Publication Data
US 2019/0358816 A1 Nov. 28, 2019

(30) Foreign Application Priority Data
Feb. 10, 2017 (JP) .............................. JP2017-022982

(51) Int. Cl.
*B25J 3/04* (2006.01)
*B25J 9/16* (2006.01)
*B25J 9/00* (2006.01)

(52) U.S. Cl.
CPC .............. *B25J 9/1682* (2013.01); *B25J 3/04* (2013.01); *B25J 9/0081* (2013.01); *B25J 9/0087* (2013.01); *B25J 9/1602* (2013.01)

(58) Field of Classification Search
CPC . B25J 3/04; B25J 9/1682; B25J 9/0081; B25J 9/0084; B25J 9/0087; B25J 9/1602;
(Continued)

(56) References Cited

U.S. PATENT DOCUMENTS 4,503,507 A * 3/1985 Takeda ............... G05B 19/4182
700/249
9,840,008 B2 * 12/2017 Komatsu .................... B25J 3/00
(Continued)

FOREIGN PATENT DOCUMENTS

JP          H10-225885 A        8/1998

OTHER PUBLICATIONS

Ishida et al., Two arc welding robots coordinated with 3-D vision sensor, 1994, IEEE, p. 830-834 (Year: 1994).*
(Continued)

*Primary Examiner* — McDieunel Marc
(74) *Attorney, Agent, or Firm* — Oliff PLC

(57) ABSTRACT

A plurality of robots each has a plurality of control modes including an automatic mode, a manual mode, and a corrected automatic mode in which the robot operates based on a task program while being sequentially corrected by the operator's manipulation. A first robot performs a first work to a work target in one of the corrected automatic mode and the manual mode, location data of the work target in a robot coordinate system of the first robot is acquired. Based on the location data of the work target in the robot coordinate system of the first robot and a relative relation between the robot coordinate system of the first robot and the robot coordinate system of the second robot, location data of the work target in a robot coordinate system of a second robot is corrected.

12 Claims, 4 Drawing Sheets

(58) Field of Classification Search
CPC . B25J 3/00; B25J 9/1664; B25J 9/1674; B25J 11/008; B25J 13/00; B25J 13/003; B25J 13/006; B25J 13/02; B25J 13/025; B25J 13/06; B25J 13/065; B25J 13/08; B25J 13/084; B25J 13/085; B25J 13/087; B25J 13/088; B25J 18/00; B25J 19/023; B25J 19/028; B25J 19/04; B25J 9/161; B25J 9/1612; B25J 9/1628; B25J 9/163; B25J 9/1633; B25J 9/1638; B25J 9/1641; B25J 9/1646; B25J 9/1653; B25J 9/1669; B25J 9/1689; B25J 9/1697; B25J 9/1676; B25J 18/04; A61B 34/32; A61B 34/37; B23P 19/04; B23P 21/00; B23P 21/002; B23Q 15/12; G05B 2219/37413; G05B 2219/45104; G05B 2219/4182; G05B 2219/33007; G05B 2219/35464; G05B 2219/37297; G05B 2219/39004; G05B 2219/39102; G05B 2219/39439; G05B 2219/39531; G05B 2219/39533; G05B 2219/40022; G05B 2219/40134; G05B 2219/40136; G05B 2219/40139; G05B 2219/40142; G05B 2219/40143; G05B 2219/40145; G05B 2219/40146; G05B 2219/40161; G05B 2219/40162; G05B 2219/40163; G05B 2219/40169; G05B 2219/40182; G05B 2219/40183; G05B 2219/40195; G05B 2219/40387; G05B 2219/40627; G05B 19/402; G05B 19/425; G05B 2219/34327; G05B 2219/50048; G06F 3/017; G06F 9/4862; G06T 7/62; G06T 7/70; H04N 5/23219; H04N 7/181; Y02P 90/02; Y10S 901/02; Y10S 901/03; Y10S 901/08; Y10S 901/09; Y10S 901/10; Y10S 901/27; Y10S 901/41; Y10S 901/46; Y10S 901/47; B65C 9/42; Y10T 156/1082; Y10T 156/1084; Y10T 156/1744; Y10T 156/1768; E02F 3/435; E02F 3/437; E02F 9/2029; E02F 9/261; E02F 9/262; E02F 9/264; E02F 9/265; E02F 9/2045; G01G 19/083; A61L 334/32

See application file for complete search history.

(56) References Cited

U.S. PATENT DOCUMENTS

| | | | |
|---|---|---|---|
| 10,456,917 B2* | 10/2019 | Okamoto | B25J 9/0084 |
| 10,806,534 B2* | 10/2020 | Hashimoto | B25J 9/161 |
| 2004/0186627 A1* | 9/2004 | Watanabe | G05B 19/425 |
| | | | 700/264 |
| 2005/0273199 A1* | 12/2005 | Ban | B25J 9/1692 |
| | | | 700/248 |
| 2006/0069466 A1* | 3/2006 | Kato | B25J 9/1682 |
| | | | 700/264 |
| 2011/0022216 A1* | 1/2011 | Andersson | G05B 19/401 |
| | | | 700/114 |
| 2016/0023355 A1* | 1/2016 | Komatsu | B25J 3/00 |
| | | | 700/248 |
| 2018/0243910 A1* | 8/2018 | Hashimoto | B25J 9/1646 |

OTHER PUBLICATIONS

Ethier et al., Telerobotic part assembly with shared visual servo control, 2002, IEEE, p. 3793-3768 (Year: 2002).*
Kasagami et al., Coordinated motion of arc welding robots using parallel data processor, 1992, IEEE, pg. (Year: 1992).*
Zhu et al., Simulation planning of robot welding line, 2011, IEEE, p. 1612-1615 (Year: 2011).*

* cited by examiner

ROBOT SYSTEM AND METHOD OF CONTROLLING THE SAME

TECHNICAL FIELD

The present disclosure relates to a robot system provided with a plurality of remote-controllable robots, and a method of controlling the robot system.

BACKGROUND ART

Conventionally, in order to automate production processes in a factory, a robot system is proposed, in which many industrial robots are introduced into the factory, and the robots are connected with each other through a communication network, or connected with an information system, to be controlled intensively. Patent Document 1 discloses this type of robot system.

Patent Document 1 discloses a system in which a plurality of work robots are connected with a network through a collaboration network interface so as to be automatically two-way communicatable and sharable of mutual work information for a work target. In this system, upon performing multiple works to the work target by the plurality of work robots mounted with sensors, each work robot corrects its own operation according to the work target by sharing measurement information on the sensors and status information of the work robots through the network. The measurement information on the sensors includes information for identifying the positions and postures of the work targets, error information produced by the operations of the work robots, and error information of the feature quantities of the work target detected by the sensors from a given model. Moreover, the status information of the work robots includes information indicative of working efficiencies, time required for the work, and standby time.

REFERENCE DOCUMENT OF CONVENTIONAL ART

Patent Document

[Patent Document 1] JP1998-225885A

DESCRIPTION OF THE DISCLOSURE

Problem to be Solved by the Disclosure

The present inventors have proposed a semiautomation of a production process in a factory using a remote control device and a plurality of remote-controllable robots operated by the remote control device. The remote-controllable robot is switchable between an automatic operation in which the robot operates as is taught beforehand, a manual operation in which the robot is operated according to manipulation inputted into the remote control device by an operator, and a corrected automatic operation in which the manipulation inputted into the remote control device by the operator is reflected to the automatic operation. The operation is suitably switched between the automatic operation, the manual operation, and the corrected automatic operation according to the contents of a work.

In the above remote-controllable robot, during the manual operation or the corrected automatic operation, an arm of the robot can be operated with high positioning accuracy with respect to a work target by the operator inputting manipulation into the remote control device. Moreover, it is possible to obtain a relative spatial relationship between the robot and the work target based on the posture of the arm of the robot. Thus, if the relative spatial relationship between the robot and the work target which are acquired during the manual operation or the corrected automatic operation is used during the automatic operation or the corrected automatic operation, it is possible to automatically correct the relative spatial relationship between the robot and the work target, and it is possible to reduce the operation of the remote control device, especially during the corrected automatic operation.

The present disclosure is made in view of the above situations, and one purpose thereof is to provide a robot system provided with a plurality of remote-controllable robots, which can reduce the burden of manipulation by an operator.

SUMMARY OF THE DISCLOSURE

According to one aspect of the present disclosure, a method of controlling a robot system provided with a remote control device and a plurality of robots is provided. Each of the plurality of robots has a plurality of control modes including an automatic mode in which the robot operates based on a task program stored beforehand and a manual mode in which the robot operates based on an operator's manipulation accepted by the remote control device. The method includes the steps of causing a first robot that is one of the plurality of robots to perform a first work to a certain work target in the manual mode, acquiring location data of the work target in a robot coordinate system of the first robot, correcting location data of the work target in a robot coordinate system of a second robot based on the location data of the work target in the robot coordinate system of the first robot and a relative relation between the robot coordinate system of the first robot and the robot coordinate system of the second robot when the second robot that is one of the plurality of robots performs a second work to the work target in the automatic mode, and causing the second robot to perform the second work using the corrected location data of the target work.

According to another aspect of the present disclosure, a method of controlling a robot system provided with a remote control device and a plurality of robots is provided. Each of the plurality of robots has a plurality of control modes including an automatic mode in which the robot operates based on a task program stored beforehand, a manual mode in which the robot operates based on an operator's manipulation accepted by the remote control device, and a corrected automatic mode in which the robot operates based on the task program while being sequentially corrected by the operator's manipulation accepted by the remote control device. The method includes the steps of causing a first robot that is one of the plurality of robots to perform a first work to a certain work target in one of the corrected automatic mode and the manual mode, acquiring location data of the work target in a robot coordinate system of the first robot, correcting location data of the work target in a robot coordinate system of a second robot based on the location data of the work target in the robot coordinate system of the first robot and a relative relation between the robot coordinate system of the first robot and the robot coordinate system of the second robot when the second robot that is one of the plurality of robots performs a second work to the work target in one of the corrected automatic mode and the automatic mode, and causing the second robot to perform the second work using the corrected location data of the target work.

According to one aspect of the present disclosure, a robot system is provided, which includes a remote control device configured to accept an operator's manipulation, a plurality of robots having a plurality of control modes including an automatic mode in which the robot operates based on a task program stored beforehand and a manual mode in which the robot operates based on the operator's manipulation accepted by the remote control device, and a host controller, communicatably connected with the remote control device and the plurality of robots, and configured to control operations of the remote control device and the plurality of robots. The host controller includes a robot control module and a correcting module. The robot control module executes a first task program to control a first robot that is one of the plurality of robots in the manual mode to perform a first work to a certain work target, and executes a second task program to control a second robot that is one of the plurality of robots in the automatic mode to perform a second work to the work target. The correcting module stores, during the first work, location data of the work target in a robot coordinate system of the first robot, corrects location data of the work target in a robot coordinate system of the second robot based on the location data of the work target in the robot coordinate system of the first robot, and a relative relation between the robot coordinate system of the first robot and the robot coordinate system of the second robot, and corrects the second task program using the corrected location data of the work target.

According to another aspect of the present disclosure, a robot system is provided, which includes a remote control device configured to accept an operator's manipulation, a plurality of robots having a plurality of control modes of an automatic mode in which the robot operates based on a task program stored beforehand, a manual mode in which the robot operates based on the operator's manipulation accepted by the remote control device, and a corrected automatic mode in which the robot operates based on the task program while being sequentially corrected by the operator's manipulation accepted by the remote control device, and a host controller, communicatably connected with the remote control device and the plurality of robots, and controls operations of the remote control device and the plurality of robots. The host controller includes a robot control module and a correcting module. The robot control module executes a first task program to control a first robot that is one of the plurality of robots to perform a first work to a certain work target in one of the corrected automatic mode and the manual mode, and executes a second task program to control a second robot that is one of the plurality of robots to perform a second work to the work target in one of the corrected automatic mode and the automatic mode. The correcting module stores, during the first work, location data of the work target in a robot coordinate system of the first robot, corrects location data of the work target in a robot coordinate system of the second robot based on the location data of the work target in the robot coordinate system of the first robot, and a relative relation between the robot coordinate system of the first robot and the robot coordinate system of the second robot, and corrects the second task program using the corrected location data of the work target.

According to the robot system and the method of controlling the same, the corrected location data of the work target by the manipulation inputted by the operator through the remote control device during the first work of the first robot is used for the second work of the second robot. Therefore, in the second work, the manipulation of the position correction for the work target using the remote control device becomes unnecessary, or can be reduced to some extent. That is, when the second robot performs the second work in the automatic mode or the corrected automatic mode, the relative spatial relationship between the second robot and the work target is corrected automatically, and especially when the second robot performs the second work in the corrected automatic mode, it is possible to reduce the manipulation of the remote control device. Therefore, the burden of the operator's manipulation of the robot system can be reduced.

Effect of the Disclosure

According to the present disclosure, in the robot system provided with the plurality of remote-controllable robots, the burden of the manipulation by the operator can be reduced.

MODES FOR CARRYING OUT THE DISCLOSURE

Figure 1:
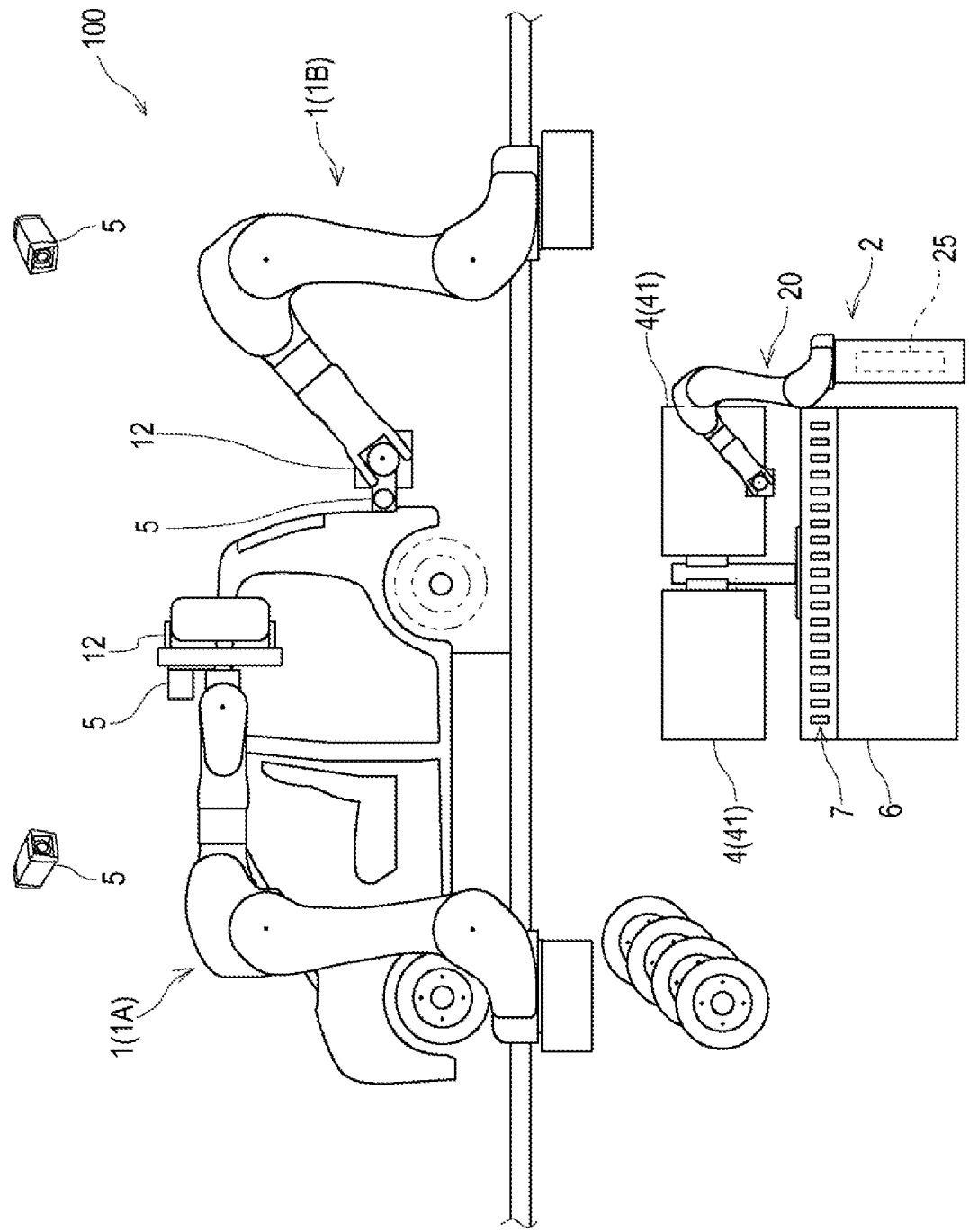
FIG. 1 is a view illustrating a situation of an automobile assembly plant into which a robot system according to one embodiment of the present disclosure is introduced.

Next, one embodiment of the present disclosure is described with reference to the drawings. As illustrated in FIG. 1, a robot system 100 according to one embodiment of the present disclosure includes a plurality of robots 1A and 1B, a remote control device 2, and a host controller 6. This robot system 100, for example, uses the plurality of robots 1A and 1B disposed around a work stage in the manufacturing plant to perform works, such as transferring, attaching of part(s), welding, to a workpiece located at the work stage.

In FIG. 1, a situation is illustrated where the two robots (the first robot 1A and the second robot 1B) are disposed around the work stage of an automobile assembly plant, and the first robot 1A performs a work in which a wheel with a tire (hereinafter, simply referred to as "the wheel") is fitted in an automobile body on the work stage, and the second robot 1B performs a work in which the wheel is fastened to an axle with bolts. However, the robot system 100 is not limited to such an automobile assembly plant, and it may be applied widely to various production equipment.

The plurality of robots 1A and 1B are disposed around the work stage so as to be separated from each other, and each has a specific robot coordinate system. Herein, when not distinguishing the first robot 1A and the second robot 1B from each other, the alphabet attached to the reference numeral is omitted to simply express it as "the robot 1."

The robot 1 according to this embodiment has three control modes of an automatic mode, a manual mode, and a corrected automatic mode. The control mode of the robot 1 can be switched so that operation of the robot is controlled by one selected from the plurality of control modes.

Herein, the control mode in which the robot 1 operates according to a preset task program is referred to as "the automatic mode." In the automatic mode, the robot 1 automatically performs a given work without a user's manipulation of the remote control device 2, similar to the conventional teaching playback robot.

Moreover, herein, the control mode in which the robot 1 operates based on the operator's manipulation accepted by the remote control device 2 is referred to as "the manual mode." The remote control device 2 can accept the manipulation inputted by the operator directly operating the remote control device 2. Note that, in the manual mode, the operator's manipulation accepted by the remote control device 2, and the motion of the robot 1 which operates based on the manipulation may be corrected automatically.

Moreover, herein, the control mode in which the robot 1 operates according to the preset task program, while being sequentially corrected by the operator's manipulation accepted by the remote control device 2 is referred to as "the corrected automatic mode." In the corrected automatic mode, the motion of the robot 1 which operates according to the preset task program is corrected based on the operator's manipulation accepted by the remote control device 2.

Below, a configuration of the robot system 100 is described in detail. [Robot 1]

Each robot 1 includes a pedestal 10, a robotic arm 11 supported by the pedestal 10, an end effector 12 attached to a hand part of the robotic arm 11, and a robot controller 15 which controls operations of the robotic arm 11 and the end effector 12. In this embodiment, the robotic arm 11 of each robot 1 is a vertical articulated robotic arm of six axes with substantially the same configuration. However, the configuration of each robotic arm 11 of the robot 1 is not limited to this embodiment, it may be a horizontal or vertical articulated robotic arm having three or more joints (the number of axes). Moreover, the plurality of robotic arms 11 may include a plurality of kinds of robotic arms having different link lengths and/or number of joints.

The robotic arm 11 includes a plurality of links coupled in series. The robotic arm 11 according to this embodiment has six joints JT1-JT6, and an independent actuator is provided to each of the joints JT1-JT6. Each actuator may be comprised of, for example, an electric motor, and a transmission mechanism which transmits the output of the electric motor to the corresponding joints JT1-JT6 (none of them is illustrated).

A mechanical interface is provided to a tip-end part of the robotic arm 11. The end effector 12 corresponding to content of a work is detachably attached to the mechanical interface. In this embodiment, the end effector 12 of one of the two robots 1A and 1B (robot 1A) is a chuck which grips the wheel, and the end effector 12 of the other robot 1B is a bolt fastening tool which fastens or tightens bolt(s).

Figure 2:
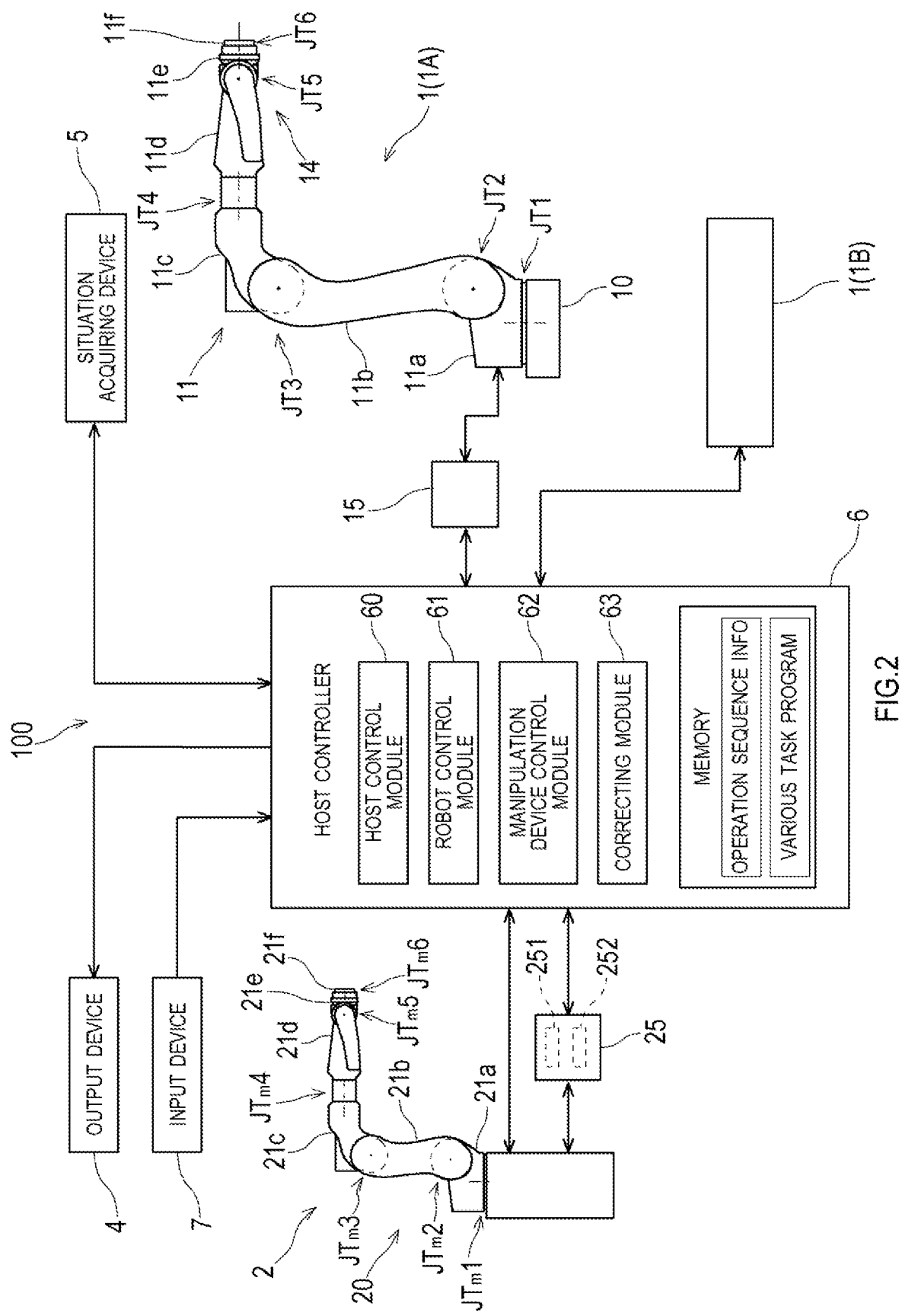
FIG. 2 is a block diagram illustrating an outline configuration of the robot system.
Figure 3:
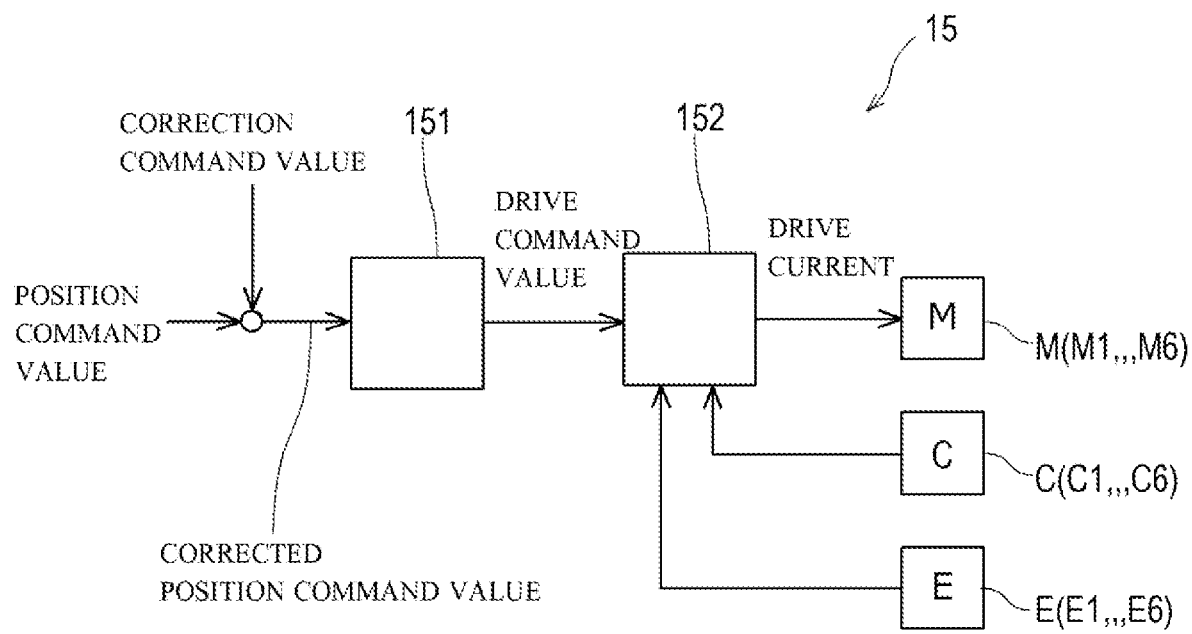
FIG. 3 is a block diagram illustrating a configuration of a control system of a robot.

FIG. 2 is a block diagram illustrating an outline configuration of the robot system 100, and FIG. 3 is a block diagram illustrating a configuration of a control system of the robot 1. As illustrated in FIGS. 2 and 3, the joints JT1-JT6 of the robotic arm 11 is provided with drive motors M1-M6, respectively, as one example of actuators each of which relatively rotates two members coupled through the joint. Moreover, the drive motors M1-M6 are provided with position sensors E1-E6 which detect rotational positions, and current sensors C1-C6 which detect current for controlling the rotation of the motors, respectively. The position sensors E1-E6 may be, for example, encoders, resolvers, and pulse generators, which detect the rotational positions. Note that, in the description of the drive motors M1-M6, the position sensors E1-E6, and the current sensors C1-C6, the suffixes of 1 to 6 are given to the alphabet corresponding to the respective joints JT1-JT6. In the following, when arbitrary joint(s) are illustrated among the joints JT1-JT6, the suffix is omitted and the joint is just referred to as "JT." The same is applied to the description of the drive motor M, the position sensor E, and the current sensor C.

The drive motor M, the position sensor E, and the current sensor C are electrically connected with the robot controller 15. The robot controller 15 includes a command generator 151 and a servo controller 152. The command generator 151 generates a drive command value based on a position command value which is stored beforehand or given from the host controller 6, and transmits the drive command value to the servo controller 152. The servo controller 152 feeds drive current corresponding to the drive command value to the drive motor M. A signal indicative of a rotation angle detected by the position sensor E is fed back to the command generator 151.

[Remote Control Device 2]

The remote control device 2 is a device which accepts the manipulation of the operator who manipulates the robot 1. The remote control device 2 is disposed apart from the robot 1. In this embodiment, one remote control device 2 is provided to the two robots 1A and 1B. In other words, the two robots 1A and 1B can be remotely controlled by one remote control device 2.

The remote control device 2 according to this embodiment includes a master arm 20 which presents the shape of an articulated robotic arm, and a controller 25 which controls operation of the master arm 20 and acquires the operator's manipulation accepted by the master arm 20. When the control mode of the robot 1 is the manual mode or the corrected automatic mode, the robotic arm 11 moves following the motion of the master arm 20. That is, the remote control device 2 is configured so that the position and posture of the robotic arm 11 can be manipulated intuitively.

The master arm 20 is an articulated robotic arm having a plurality of and the same number of joints JTm1-JTm6 as the robotic arm 11, and is a serially connected body of a plurality of links 21a-21f supported by a pedestal. The serially connected configuration of the links 21a-21f of the master arm 20 is substantially the same as the serially connected configuration of links 11a-11f of the robotic arm 11 and, thus, the detailed description thereof is omitted. A pseudo end effector which is similar or corresponds to the shape of the end effector 12 attached to the robotic arm 11 may be attached to a tip-end part of the master arm 20.

The joints JTm1-JTm6 are provided with drive motors Mm1-Mm6 (not illustrated), respectively, as one example of actuators each of which relatively rotates two members coupled by the joint. Moreover, the drive motors Mm1-Mm6 are provided with position sensors Em1-Em6 (not illustrated) which detect rotational positions of the motors, and current sensors Cm1-Cm6 (not illustrated) which detect current for controlling the rotation of the motors, respectively. The position sensors Em1-Em6 are, for example, encoders. Note that, in the description of the drive motors Mm1-Mm6, the position sensors Em1-Em6, and the current sensors Cm1-Cm6, the suffixes of 1 to 6 are given to the alphabet corresponding to the respective joints JTm1-JTm6. Below, when arbitrary joint(s) is illustrated among the joints JTm1-JTm6, the suffix is omitted and it is just referred to as "JTm." The same is also applied to the drive motor Mm, the position sensor Em, and the current sensor Cm.

Similar to the drive system of the robot 1 described above, the drive motor Mm, the position sensor Em, and the current sensor Cm are electrically connected to the controller 25. The controller 25 includes a command generator 251 and a servo controller 252. The command generator 251 generates a drive command value based on a position command value stored beforehand or given from the host controller 6, and transmits the drive command value to the servo controller 252. The servo controller 252 feeds drive current corresponding to the drive command value to the drive motor Mm. A signal indicative of a rotation angle detected by the position sensor Em is fed back to the command generator 251.

Similar to the servo controller 152 described above, the servo controller 252 generates the drive command value (torque command value) based on the position command value, a servo gain, etc. which are acquired from the host controller 6 described later, and feeds the drive current corresponding to the drive command value to the drive motor Mm. An output rotation angle of the drive motor Mm is detected by the position sensor Em, and is fed back to the servo controller 252.

[Host Controller 6]

The host controller 6 controls operation of the plurality of robots 1. The host controller 6 is communicatably connected to a situation acquiring device 5, an output device 4, an input device 7, the robot controller 15 for each robot 1, the controller 25 of the remote control device 2, etc.

The input device 7 is an input device which is installed outside a workspace together with the remote control device 2, accepts an operational instruction from the operator, and inputs the received operational instruction into the host controller 6. Into the input device 7, manipulations other than the manipulation according to the position and posture of the robot 1 are inputted. The input device 7 is provided with one or more operational input implements for inputting the manipulation instructions other than the position and posture of the robot 1, such as an operational input implement for selecting the control mode of the robot 1 and an emergency stop switch. The one or more operational input implements may include, for example, known operational input implements, such as a touch panel, a key, a lever, a button, a switch, and a dial or toggle. Moreover, personal digital assistants, such as a pendant and a tablet, may also be used as the input device 7.

The situation acquiring device 5 is a device which acquires status information indicative of the situation in the workspace of each robot 1. The situation acquiring device 5 may be, for example, implemented by a sensor, an imaging device (camera), a communications apparatus, an encoder, etc. The status information includes information to be used for recognizing the position and posture etc. of the robot 1 in the workspace, and the situation around the robot 1. More specifically, the status information includes information necessary for enabling the recognition of a situation of the robot 1 and the situation around the robot 1 in the workspace, such as the position and posture of the robot 1 in the workspace, the spatial relationship between the robot 1 and the workpiece, or the spatial relationship between the robot 1 and a part to which the workpiece is assembled.

The situation acquiring device 5 sequentially acquires the status information, and the acquired status information is inputted into the host controller 6 where it is used for a motion control of the robot 1. The situation acquiring device 5 may be attached to robot 1 itself, or may be attached to a suitable position in the workspace. Moreover, the number of situation acquiring devices 5 attached may be one or more. The attaching position and the attaching number are arbitrary, as long as a suitable number of situation acquiring devices 5 are attached to positions where the status information can be acquired appropriately.

The output device 4 outputs information transmitted from the host controller 6. The output device 4 is installed at a position where the operator who manipulates the remote control device 2 is easy to visually observe the device. The output device 4 includes at least a display device 41, and may further include a printer, a speaker, a hazard light, etc. On the display device 41, the information transmitted from the host controller 6 is displayed. For example, by the speaker, the information transmitted from the host controller 6 is outputted as sound. Alternatively, for example, by the printer, the information transmitted from the host controller 6 is printed output to a recording medium, such as paper.

The host controller 6 is a so-called computer, and has a processor, such as a CPU, and a memory, such as a ROM and/or a RAM, (none of them is illustrated). The memory stores a control program executed by the host controller 6, various fixed data, etc. The processor transmits and receives data to and from external equipment. Moreover, the processor accepts inputs of detection signals from various sensors, and outputs a control signal to each controlled object. In the host controller 6, the processor reads and executes software, such as the program stored in the memory to perform processings for controlling various operations of the system 100. Note that the host controller 6 may execute each processing by a centralized control with a sole computer, or may execute each processing by a distributed control with a collaboration of a plurality of computers. Moreover, the host controller 6 may be comprised of a micro controller, a programmable logic controller (PLC), etc.

The host controller 6 includes, as functional blocks, a host control module 60 which manages the entire operation of the robot system 100, a plurality of robot control modules 61, a manipulation device control module 62, and a correcting module 63. In FIG. 2, although these functional blocks are collectively illustrated in a single host controller 6, they may be implemented by one or more independent computers which execute each functional block or a combination of the plurality of functional blocks. In such a case, a part of the functional blocks may be disposed in the workspace, and the remainder may be disposed outside the workspace.

The robot control module 61 controls the operation of the robot 1. In more detail, based on the program stored beforehand, or based on the operator's manipulation accepted by the remote control device 2, the robot control module 61 generates the position command value, and gives it to the robot controller 15 of the robot 1.

The manipulation device control module 62 controls the operation of the remote control device 2. In more detail, when the robot 1 is in the corrected automatic mode or the manual mode, the manipulation device control module 62 controls the operation of the master arm 20 so that the posture of the robotic arm 11 of the robot 1 corresponds to the posture of the master arm 20 of the remote control device 2. Moreover, when the robot 1 is in the corrected automatic mode or the manual mode, the manipulation device control module 62 calculates the posture of the master arm 20, and the position of the hand part of the master arm 20, based on the detection values of the position sensors Em1-Em6 provided to the actuators of the respective joints of the master arm 20.

When a path of the robot 1 scheduled by the program is corrected based on the operator's manipulation accepted by the remote control device 2, the correcting module 63 corrects the path of the robot 1 in the subsequent work using information according to the correction. Processing of the correcting module 63 will be described in detail later.

[Operation of Robot System 100]

Next, one example of operation of the robot system 100 of the above configuration is described. The host controller 6 stores operation sequence information beforehand, and controls operation of each robot 1 based on the operation sequence information. Below, although a positional reference of the robot 1 is described as the hand part of the arm 11, it is not limited to this location.

Figure 4:
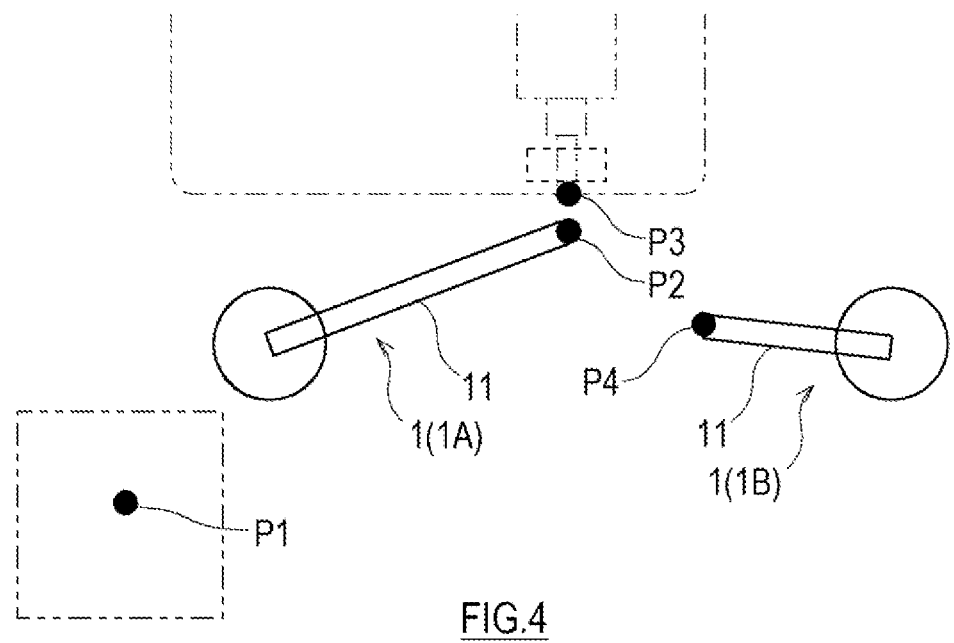
FIG. 4 is a view illustrating a situation of operation of a first robot.

FIG. 4 is a view illustrating a situation of operation of the first robot 1A. As illustrated in FIG. 4, first the first robot 1A moves the hand part of the arm 11 to an extraction position P defined in a pallet where the wheels are accommodated, grips and takes out a given wheel by the chuck which is the end effector 12, and moves the hand part of the arm 11 to a standby position P2 along a given path from the extraction position P. The standby position P2 is defined at a position in front of an attaching position P3 (i.e., a work position) when performing an attaching work of the wheel to the automobile body. A transfer task of the wheel from the extraction position P1 to the standby position P2 is performed in the automatic mode. That is, the host controller 6 executes a transfer task program stored beforehand, and, thereby, the first robot 1A is controlled so that the hand part of the arm 11 moves along the taught path.

Next, the first robot 1A moves the hand part of the arm 11 to the attaching position P3 from the standby position P2 while gripping the wheel by the chuck to fit the wheel onto the axle, and then releases the wheel gripped by the chuck. The series of attachment task of the wheel is performed in the corrected automatic mode.

In the corrected automatic mode and the manual mode, the host controller 6 controls the operation of the master arm 20 so that the posture of the robot 1 to be manipulated (i.e., the robot manipulated by the remote control device 2) corresponds to the posture of the master arm 20. Further, the host controller 6 displays, in the corrected automatic mode and the manual mode, the status information of the robot 1 to be manipulated (especially, the hand part and the end effector 12 of the arm 11) on the display device 41. The operator can manipulate the remote control device 2, while visually observing the status information of the robot 1 to be manipulated, displayed on the display device 41.

The host controller 6 executes the attachment task program stored beforehand, and, thereby, the first robot 1A is controlled so that the hand part of the arm 11 moves along the taught path. In the meantime, the host controller 6 corrects the motion of the first robot 1A based on the operator's manipulation accepted by the remote control device 2.

For example, while the first robot 1A moves the hand part of the arm 11 along the taught path to the attaching position P3 from the standby position P2, the master arm 20 changes its posture according to the motion of the first robot 1A so that the posture of the master arm 20 becomes the posture corresponding to the first robot 1A which is the robot 1 to be manipulated. Then, when the operator moves the master arm 20 to change the path of the movement of the hand part, the remote control device 2 accepts the displacement from the taught path of the hand part of the master arm 20 as a correction instruction, and transmits it to the host controller 6.

The host controller 6 calculates a correction command value based on the acquired correction instruction signal. An operational expression for calculating the correction command value from the correction instruction signal may be stored beforehand in the host controller 6. The host controller 6 gives the position command value corrected by the generated correction command value to the command generator 151 of the first robot 1A, and, as a result, the operation of the first robot 1A becomes such operation that the correction instruction accepted by the remote control device 2 is reflected to the motion based on the given attachment task program.

Thus, in the corrected automatic mode, the robot 1 to be manipulated automatically operates in principle as the robot 1 is taught based on the given task program, and when the remote control device 2 accepts the correction instruction from the operator, the automatic operation is corrected based on the correction instruction. Note that, although the control mode of the first robot 1A which performs the attachment task is the corrected automatic mode, the operator may be selectable of either the corrected automatic mode or the manual mode. When the control mode of the first robot 1A which performs the attachment task is the manual mode, the remote control device 2 accepts the manipulation which is inputted by the operator moving the master arm 20, and the host controller 6 generates the position command value based on the manipulation signal accepted by the remote control device 2, and gives the position command value to the robot controller 15 of the robot 1 to be manipulated.

When the hand part of the arm 11 reaches the attaching position P3 as described above, the host controller 6 acquires location data of the wheel in a robot coordinate system of the first robot 1A, and stores it in the memory. The host controller 6 can calculate the position of the hand part the arm 11 of the first robot 1A based on the detection values of the position sensors E1-E6 at the attaching position P3, and can identify the location data of the wheel based on a known spatial relationship between the hand part of the arm 11 and the wheel gripped by the chuck. The acquired location data of the wheel in the robot coordinate system of the first robot 1A may be different from the taught location data due to the correction instruction accepted by the remote control device 2 during the attachment task.

When the above attachment task is finished, the host controller 6 changes the control mode of the first robot 1A to the automatic mode, and starts the transfer task of the wheel again. On the other hand, the host controller 6 causes the second robot 1B to start the bolt fastening task.

Figure 5:
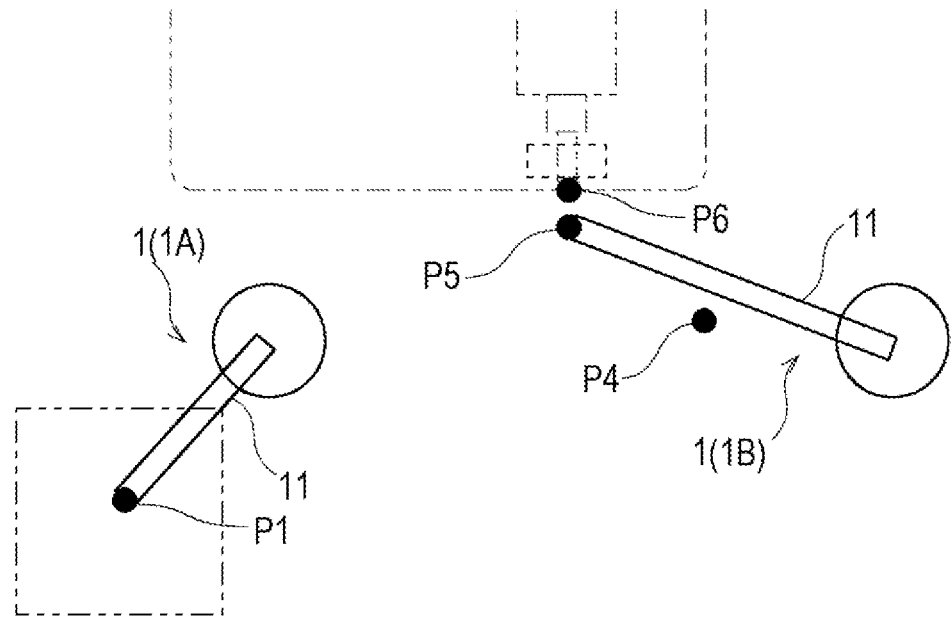
FIG. 5 is a view illustrating a situation of operation of a second robot.

FIG. 5 is a view illustrating a situation of operation of the second robot 1B. As illustrated in FIG. 5, in the bolt fastening task, the second robot 1B is controlled in the corrected automatic mode so that a first step in which the hand part of the arm 11 moves to a standby position P5 from an evacuation position P4, a second step in which the hand part of the arm 11 moves to a fastening position P6 which is the work position from the standby position P5, and a third step in which the bolt is fastened at the fastening position P6, are performed in this order. However, the second robot 1B which performs the bolt fastening task may be controlled in the automatic mode. The evacuation position P4 is defined so that the first robot 1A and the second robot 1B which perform the transfer task and the attachment task do not interfere with each other. The standby position P5 may be located immediately in front of the fastening position P6.

Upon starting the bolt fastening task, the host controller 6 reads the location data of the wheel in the robot coordinate system of the first robot 1A stored during the attachment task, and corrects the bolt fastening task program.

The host controller 6 may use the correction command value and the correction instruction signal as the information for correction, instead of the location data of the wheel in the robot coordinate system of the first robot 1A.

The relative spatial relationship between the robot coordinate system of the first robot 1A and the robot coordinate system of the second robot 1B is known. The host controller 6 corrects the location data of the wheel in the robot coordinate system of the second robot 1B by using the relative spatial relationship between the robot coordinate system of the first robot 1A and the robot coordinate system of the second robot 1B, and the corrected location data of the wheel in the robot coordinate system of the first robot 1A. Further, the host controller 6 corrects the standby position P5 in the bolt fastening task based on the corrected location data of the wheel in the robot coordinate system of the second robot 1B. Therefore, in the bolt fastening task, the hand part of the arm 11 of the second robot 1B moves to the corrected standby position P5 from the evacuation position P4, and moves to the fastening position P6 from the corrected standby position P5 according to the bolt fastening task program, i.e., through the taught path.

In the above description, the standby position P5 is a target position before the movement to the work position (fastening position P6) where the positional accuracy is required. Since the standby position P5 is corrected, the spatial relationship between the position of the wheel and the standby position P5 is always fixed. Therefore, when a correction of the path is needed for the movement to the fastening position P6 from the standby position P5 due to the positional error etc. of a bolt fastening part to the wheel, an amount of the correction can be reduced.

Figure 6:
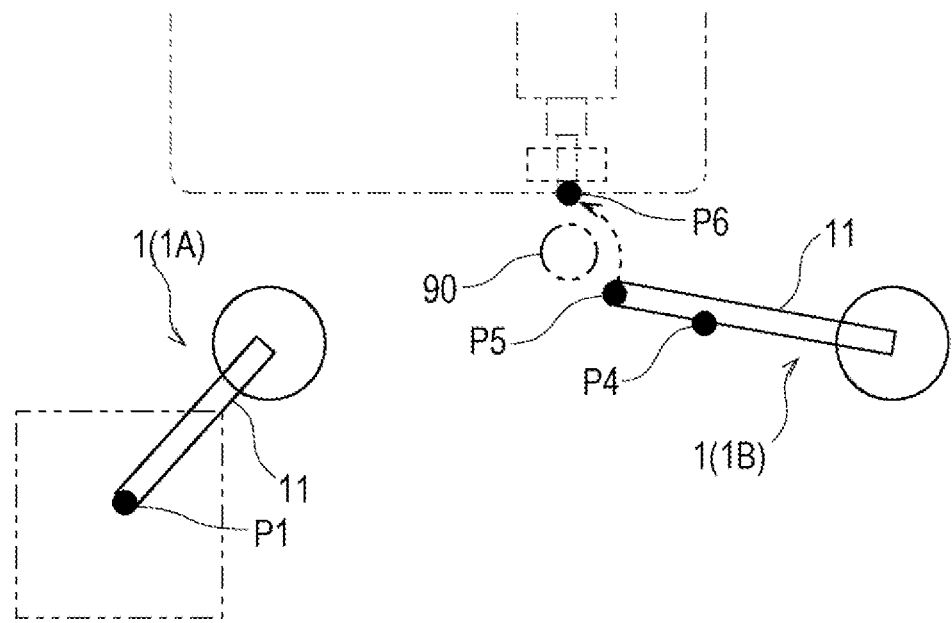
FIG. 6 is a view illustrating a situation of operation of a second robot according to a modification.

Note that, in the above description, the standby position P5 is defined near the work position where the positional accuracy is required in the path of the arm 11 of the robot 1. However, as illustrated in FIG. 6, if an interference evasion area 90 (for example, an area where the arm detours to avoid an obstacle therein) is on the path of the arm 11, the standby position may be set at a position immediately before entering into the interference evasion area 90 in the path of the arm 11. Thus, since the spatial relationship between the obstacle to avoid and the standby position P5 becomes always fixed, an interference of the robot 1 with the obstacle can certainly be avoided, if the arm moves along the taught path from the standby position P5.

As described above, in the robot system 100 according to this embodiment, each of the plurality of robots 1 has the plurality of control modes of the automatic mode in which the robot operates based on the task program stored beforehand, the manual mode in which the robot operates based on the operator's manipulation accepted by the remote control device 2, and the corrected automatic mode in which the robot operates based on the task program while being sequentially corrected by the operator's manipulation accepted by the remote control device 2. The method of controlling the robot system 100 is characterized in that the first robot 1A which is one of the plurality of robots 1 performs in the corrected automatic mode (or in the manual mode) a first work to a certain work target to acquire the location data of the work target in the robot coordinate system of the first robot. Further, when the second robot 1B which is one of the plurality of robots 1 performs a second work to the work target in the corrected automatic mode (or in the automatic mode), the location data of the work target in the robot coordinate system of the second robot 1B is corrected based on the location data of the work target in the robot coordinate system of the first robot 1A, and the relative relation between the robot coordinate system of the first robot 1A and the robot coordinate system of the second robot 1B, and the second robot 1B performs the second work using the corrected location data of the target work.

Moreover, the robot system 100 according to this embodiment includes the remote control device 2 which accepts the operator's manipulation, and the plurality of robots 1 having the plurality of control modes of the automatic mode in which the robot operates based on the task program stored beforehand, the manual mode in which the robot operates based on the operator's manipulation accepted by the remote control device 2, and the corrected automatic mode in which the robot operates based on the task program while being sequentially corrected by the operator's manipulation accepted by the remote control device 2. The system also includes the host controller 6 which is communicatably connected with the remote control device 2 and the plurality of robots 1, and controls the operations of the remote control device 2 and the plurality of robots 1. The host controller 6 is characterized by including the robot control module 61 which executes a first task program to control in the corrected automatic mode (or in the manual mode) the first robot 1A which is one of the plurality of robots 1 to perform the first work to the certain work target, and executes a second task program to control in the corrected automatic mode (or in the automatic mode) the second robot 1B which is one of the plurality of robots 1 to perform the second work to the work target. The host controller 6 also includes the correcting module 63 which stores, during the first work, the location data of the work target in the robot coordinate system of the first robot 1A, corrects the location data of the work target in the robot coordinate system of the second robot 1B based on the location data of the work target in the robot coordinate system of the first robot 1A and the relative relation between the robot coordinate system of the first robot 1A and the robot coordinate system of the second robot 1B, and corrects the second task program using the corrected location data of the work target.

According to the robot system 100 and the method of controlling the same, the corrected location data of the work target by the manipulation inputted by the operator through the remote control device 2 during the first work of the first robot 1A is used for the second work of the second robot 1B. Therefore, in the second work, the manipulation of the position correction for the work target using the remote control device 2 becomes unnecessary, or can be reduced to some extent. That is, when the second robot 1B performs the second work in the automatic mode or the corrected automatic mode, the relative spatial relationship between the second robot 1B and the work target is corrected automatically, and especially when the second robot 1B performs the second work in the corrected automatic mode, it is possible to reduce the manipulation of the remote control device 2. Therefore, the burden of the operator's manipulation of the robot system 100 can be reduced.

Moreover, in the method of controlling the robot system 100 according to the above embodiment, the second work includes the first step in which the hand part of the arm 11 of the second robot 1B moves to the given standby position P5 from the given evacuation position P4, and the second step in which the hand part of the arm 11 of the second robot 1B moves to the given work position (fastening position P6) from the standby position P5. Then, the path of the first step is corrected based on the corrected location data of the work target so that the spatial relationship between the standby position P5 and the work target is maintained constant.

Similarly, in the robot system 100 according to the above embodiment, the correcting module 63 corrects the path of the first step based on the corrected location data of the work target so that the spatial relationship between the standby position P5 and the work target is maintained constant.

Thus, since the spatial relationship between the standby position P5 and the work target is maintained at the given relation even if the error occurs in the relative location between the second robot 1B and the work target, the second robot 1B can reach the work position P6 by following the taught path in the second step. When the second robot 1B operates in the corrected automatic mode and the error occurs in the relative location between the work position P6 and the work target, the amount of the correction of the path to the work position P6 from the standby position P5 can be reduced, thereby reducing the burden of operator's manipulation.

Moreover, in the robot system 100 and the method of operating the same according to the above embodiment, the standby position may be defined so that the interference evasion area 90 where the arm detours to avoid the interference with the obstacle therein is included in the path from the standby position P5 to the work position (fastening position P6).

Thus, the standby position P5 is provided immediately in front of the interference evasion area 90, and the path of the second robot 1B in the first step is corrected so that the spatial relationship between the standby position P5 and the work target is maintained constant. According to this configuration, the second robot 1B can avoid the obstacle certainly and reach the work position P6 by following the taught path in the second step. Further, when the second robot 1B operates in the corrected automatic mode and the error occurs in the relative location between the work position P6 and the work target, the amount of the correction of the path to the work position P6 from the standby position P5 can be reduced, thereby reducing the burden of operator's manipulation.

Although the suitable embodiment of the present disclosure is described above, changes to the details of the concrete structures and/or the functions of the above embodiment may also be encompassed by the present disclosure, without departing from the spirit of the present disclosure.

For example, although in the robot system 100 according to the above embodiment each robot 1 has the plurality of control modes of the automatic mode, the manual mode, and the corrected automatic mode, the present disclosure can be applied also when the system is changed so that the robot 1 has a plurality of control modes including the automatic mode and the manual mode.

In such an example of the change, the method of controlling the robot system 100 includes causing the first robot 1A which is one of the plurality of robots 1 to perform the first work to the certain work target in the manual mode, acquiring the location data of the work target in the robot coordinate system of the first robot, and when the second robot 1B which is one of the plurality of robots 1 performs the second work to the work target in the automatic mode, correcting the location data of the work target in the robot coordinate system of the second robot 1B based on the location data of the work target in the robot coordinate system of the first robot 1A and the relative relation between the robot coordinate system of the first robot 1A and the robot coordinate system of the second robot 1B, and causing the second robot 1B to perform the second work using the corrected location data of the target work.

Further, in such an example of the change, the robot system 100 includes the remote control device 2 which accepts the operator's manipulation, and the plurality of robots 1 having the plurality of control modes of the automatic mode in which the robot operates based on the task program stored beforehand, and the manual mode in which the robot operates based on the operator's manipulation accepted by the remote control device 2. The system also includes the host controller 6 which is communicatably connected with the remote control device 2 and the plurality of robots 1, and controls the operations of the remote control device 2 and the plurality of robots 1. Then, the host controller 6 includes the robot control module 61 which executes the first task program to control the first robot 1A which is one of the plurality of robots 1 in the manual mode to perform the first work to the certain work target, and executes the second task program to control the second robot 1B which is one of the plurality of robots 1 in the automatic mode to perform the second work to the work target. The host controller 6 also includes the correcting module 63 which stores, during the first work, the location data of the work target in the robot coordinate system of the first robot 1A, and corrects the location data of the work target in the robot coordinate system of the second robot 1B, based on the location data of the work target in the robot coordinate system of the first robot 1A and the relative relation between the robot coordinate system of the first robot 1A and the robot coordinate system of the second robot 1B, and corrects the second task program using the corrected location data of the work target.

Also in such an example of the change, similar to the above embodiment, the corrected location data of the work target by the manipulation inputted by the operator through the remote control device 2 during the first work of the first robot 1A is used for the second work of the second robot 1B. Therefore, in the second work, the second robot 1B which operates in the automatic mode can operate on the corrected path, without the worker inputting the correction separately, thereby performing the precision work to the work target.

DESCRIPTION OF REFERENCE CHARACTERS 1, 1A, 1B: Robot
2: Remote Control Device
4: Output Device
5: Situation Acquiring Device
6: Host Controller
60: Host Control Module
61: Robot Control Module
62: Manipulation Device Control Module
63: Correcting Module
7: Input Device
10: Pedestal
11: Robotic Arm
11a-11f: Link
12: End Effector
15: Robot Controller
20: Master Arm
21a-21f: Link
25: Controller
41: Display Device
100: Robot System
C1-C6: Current Sensor
E1-E6: Position Sensor
JT1-JT6, JTm1-JTm6: Joint
M1-M6: Drive Motor

What is claimed is:
1. A method of controlling a robot system provided with a remote control device and a plurality of robots, each of the plurality of robots having a plurality of control modes including an automatic mode in which the robot operates based on a task program stored beforehand and a manual mode in which the robot operates based on an operator's manipulation accepted by the remote control device, the method comprising the steps of:

causing a first robot that is one of the plurality of robots to perform a first work to a certain work target in the manual mode, and acquiring location data of the work target in a robot coordinate system of the first robot; and when a second robot that is one of the plurality of robots performs a second work to the work target in the automatic mode, correcting location data of the work target in a robot coordinate system of the second robot based on the location data of the work target in the robot coordinate system of the first robot and a relative relation between the robot coordinate system of the first robot and the robot coordinate system of the second robot, and causing the second robot to perform the second work using the corrected location data of the work target.

2. A method of controlling a robot system provided with a remote control device and a plurality of robots, each of the plurality of robots having a plurality of control modes including an automatic mode in which the robot operates based on a task program stored beforehand, a manual mode in which the robot operates based on an operator's manipulation accepted by the remote control device, and a corrected automatic mode in which the robot operates based on the task program while being sequentially corrected by the operator's manipulation accepted by the remote control device, the method comprising the steps of:

causing a first robot that is one of the plurality of robots to perform a first work to a certain work target in one of the corrected automatic mode and the manual mode, and acquiring location data of the work target in a robot coordinate system of the first robot; and when a second robot that is one of the plurality of robots performs a second work to the work target in one of the corrected automatic mode and the automatic mode, correcting location data of the work target in a robot coordinate system of the second robot based on the location data of the work target in the robot coordinate system of the first robot and a relative relation between the robot coordinate system of the first robot and the robot coordinate system of the second robot, and causing the second robot to perform the second work using the corrected location data of the work target.

3. The control method of claim 1, wherein the second work includes a first step in which a hand part of the second robot moves to a given standby position from a given evacuation position, and a second step in which the hand part of the second robot moves to a given work position from the standby position, and wherein a path of the first step is corrected based on the corrected location data of the work target so that a spatial relationship between the standby position and the work target is maintained constant.

4. The control method of claim 3, wherein the standby position is defined so as to include an interference evasion area where an arm of the robot detours to avoid an interference with an obstacle therein in a path to the work position from the standby position.

5. A robot system, comprising:
a remote control device configured to accept an operator's manipulation;
a plurality of robots having a plurality of control modes including an automatic mode in which the robot operates based on a task program stored beforehand and a manual mode in which the robot operates based on the operator's manipulation accepted by the remote control device; and
a host controller, communicatably connected with the remote control device and the plurality of robots, and configured to control operations of the remote control device and the plurality of robots, the host controller including a robot control module and a correcting module,
wherein the robot control module executes a first task program to control a first robot that is one of the plurality of robots in the manual mode to perform a first work to a certain work target, and executes a second task program to control a second robot that is one of the plurality of robots in the automatic mode to perform a second work to the work target, and
wherein the correcting module stores, during the first work, location data of the work target in a robot coordinate system of the first robot, corrects location data of the work target in a robot coordinate system of the second robot based on the location data of the work target in the robot coordinate system of the first robot, and a relative relation between the robot coordinate system of the first robot and the robot coordinate system of the second robot, and corrects the second task program using the corrected location data of the work target.

6. A robot system, comprising:
a remote control device configured to accept an operator's manipulation;
a plurality of robots having a plurality of control modes of an automatic mode in which the robot operates based on a task program stored beforehand, a manual mode in which the robot operates based on the operator's manipulation accepted by the remote control device, and a corrected automatic mode in which the robot operates based on the task program while being sequentially corrected by the operator's manipulation accepted by the remote control device; and
a host controller, communicatably connected with the remote control device and the plurality of robots, and controls operations of the remote control device and the plurality of robots, the host controller including a robot control module and a correcting module,
wherein the robot control module executes a first task program to control a first robot that is one of the plurality of robots in one of the corrected automatic mode and the manual mode to perform a first work to a certain work target, and executes a second task program to control a second robot that is one of the plurality of robots to perform a second work to the work target in one of the corrected automatic mode and the automatic mode, and
wherein the correcting module stores, during the first work, location data of the work target in a robot coordinate system of the first robot, corrects location data of the work target in a robot coordinate system of the second robot based on the location data of the work target in the robot coordinate system of the first robot, and a relative relation between the robot coordinate system of the first robot and the robot coordinate system of the second robot, and corrects the second task program using the corrected location data of the work target.

7. The robot system of claim 5, wherein the second work includes a first step in which a hand part of the second robot moves to a given standby position from a given evacuation position, and a second step in which the hand part of the second robot moves to a given work position from the standby position, and wherein the correcting module corrects a path of the first step based on the corrected location data of the work target so that a spatial relationship between the standby position and the work target is maintained constant.

8. The robot system of claim 7, wherein the standby position is defined so that an interference evasion area where an arm of the robot detours to avoid an interference with an obstacle therein is included in the path to the work position from the standby position.

9. The control method of claim 2, wherein the second work includes a first step in which a hand part of the second robot moves to a given standby position from a given evacuation position, and a second step in which the hand part of the second robot moves to a given work position from the standby position, and wherein a path of the first step is corrected based on the corrected location data of the work target so that a spatial relationship between the standby position and the work target is maintained constant.

10. The control method of claim 9, wherein the standby position is defined so as to include an interference evasion area where an arm of the robot detours to avoid an interference with an obstacle therein in a path to the work position from the standby position.

11. The robot system of claim 6, wherein the second work includes a first step in which a hand part of the second robot moves to a given standby position from a given evacuation position, and a second step in which the hand part of the second robot moves to a given work position from the standby position, and wherein the correcting module corrects a path of the first step based on the corrected location data of the work target so that a spatial relationship between the standby position and the work target is maintained constant.

12. The robot system of claim 11, wherein the standby position is defined so that an interference evasion area where an arm of the robot detours to avoid an interference with an obstacle therein is included in the path to the work position from the standby position.

* * * * *